United States Patent

Toffolon

[11] Patent Number: 4,754,671
[45] Date of Patent: Jul. 5, 1988

[54] COMBINATION CUT-OFF TOOL/BAR PULLER

[75] Inventor: Joseph F. Toffolon, Southington, Conn.

[73] Assignee: Progressive Machinery Sales, Inc., Southington, Conn.

[21] Appl. No.: 14,441

[22] Filed: Feb. 13, 1987

[51] Int. Cl.[4] .......................... B31B 5/14; B31B 13/12
[52] U.S. Cl. .......................................... 82/2.5; 82/35; 82/102; 407/1; 407/117
[58] Field of Search ...................... 82/2.5, 2.7, 35, 102; 407/1, 117; 414/14, 15, 16, 17, 18

[56] References Cited

U.S. PATENT DOCUMENTS

| Re. 25,955 | 2/1966 | Emmons | 407/117 |
|---|---|---|---|
| 3,557,417 | 1/1971 | Kollar | 407/117 |
| 4,404,878 | 9/1983 | Blanchard et al. | 82/2.5 |
| 4,464,958 | 8/1984 | Luks | 82/2.5 |
| 4,522,091 | 6/1985 | Toffolon | 82/2.5 |
| 4,580,470 | 4/1986 | Buck | 82/2.5 |
| 4,617,847 | 10/1986 | Schalpach | 82/2.5 |

FOREIGN PATENT DOCUMENTS

| 0027783 | 4/1981 | European Pat. Off. | 407/117 |
|---|---|---|---|
| 0138412 | 10/1979 | German Democratic Rep. | 82/2.5 |

Primary Examiner—Frederick R. Schmidt
Assistant Examiner—William E. Terrell
Attorney, Agent, or Firm—McCormick, Paulding and Huber

[57] ABSTRACT

A combination tool mounted at a work station on the turret of a CNC lathe includes a cut-off tool having a tool holder body supporting a carbide cutter insert at its forward end. A bar puller mounted on the tool holder body has a pair of vertically spaced apart and forwardly extending spring fingers which carry opposing adjustable bar gripping jaws. The jaws receive and grip the free end portion of an associated bar therebetween upon further movement of the combination tool toward the bar after the cut-off tool has completed a cut-off operation on the bar.

10 Claims, 1 Drawing Sheet

COMBINATION CUT-OFF TOOL/BAR PULLER

BACKGROUND OF THE INVENTION

This invention relates in general to tools and stack feed attachments for machine tools and deals more particularly an improved combination tool for a numerically controlled turret lathe or the like.

In a CNC machine of the type with which the present invention is concerned, it is customary to provide a cut-off tool at one tool station for separating each finished workpiece for the bar stock or bar from which it is machined and a bar puller at another tool station for advancing the bar in preparation for the next maching operation. The tool carriage on such a machine tool is normally programed to return to home position before indexing. Consequently, considerable machine time is required to move the carriage after each operation, which represents a substantial part of the cost of producing a work piece.

The angular spacing between tools in a machine of the aforedescribed general type is determined by the number of tools required and in some instances by the size of the tools. Compact tools are, of course, desirable to enable complete utilization of all available tool stations.

Accordingly, it is the general aim of the present invention to provide a compact combination tool for a CNC lathe or the like to minimize tool space requirements and to enable cut-off and bar pulling operations to be performed at a single tool station to minimize the machine carriage movements and the time required to perform the aforesaid operations.

SUMMARY OF THE INVENTION

In accordance with the present invention a combination tools provided which includes a cut-off tool and bar puller. The cut-off tool has an elongated tool holder body including a shank portion at its rear end and means for releasably retaining a cutter insert at its forward end. A mounting member attached to the tool holder intermediate its ends carries a pair of resilient vertically spaced apart fingers mounted thereon and extending in a forward direction. A pair of opposing jaws are mounted at the forward ends of the fingers. The jaws are spaced rearwardly of the cutting edge of the insert and are laterally positioned relative to the cutter insert.

DETAILED DESCRIPTION OF PREFERRED EMBODIMENT

Figure 1:
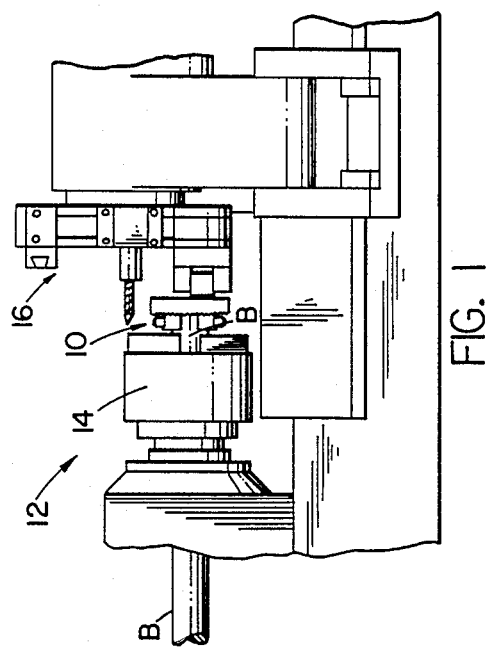
FIG. 1 is a fragmentary side elevational view of a numerically controlled turret lathe having a combination tool embodying the present invention mounted at an associated tool station on its turret.

Referring now to the drawing, a combination tool embodying the present invention and indicated generally by the reference numeral 10 is shown in FIG. 1 mounted at a tool station on the turret of a numerically controlled lathe 12. The machine 12, which may, for example, comprise a MORI SEIKI SL-4 CNC Lathe, includes a turning center or chuck mechanism 14 for gripping and rotating a bar, indicated by the letter B, and a rotary turret indicated generally at 16 which carries a plurality of angularly spaced I.D. or O.D. tools for performing boring and/or turning operations on the rotating bar B to form a free-end portion of the bar into a workpiece (not shown).

The combination tool 10 includes a cut-off tool indicated generally at 18 and adapted to sever a finished workpiece from the rotating bar B upon completion of the machining cycle, leaving a free end portion of the bar projecting from the chuck mechanism 14. The combination tool 10 also includes a bar puller indicated generally at 20 and adapted to grip the projecting free end portion of the bar B and to pull the end portion into machining position when the chucking mechanism 14 is released and the turret 16 is backed toward its home position in preparation for the next workpiece machining cycle.

Figure 3:
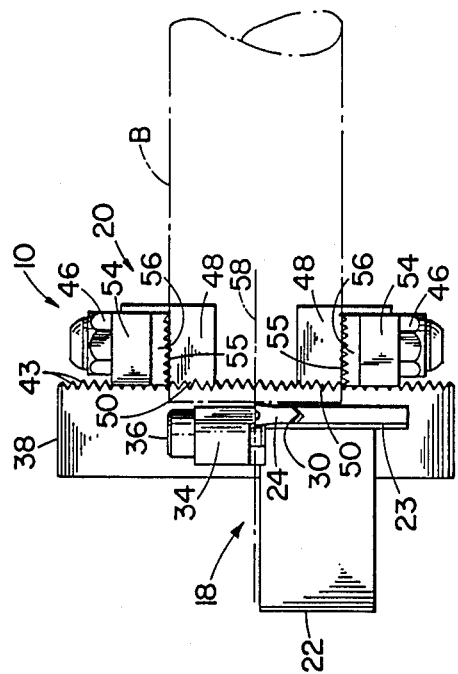
FIG. 3 is a front elevational view of the combination tool shown in FIG. 2.
Figure 2:
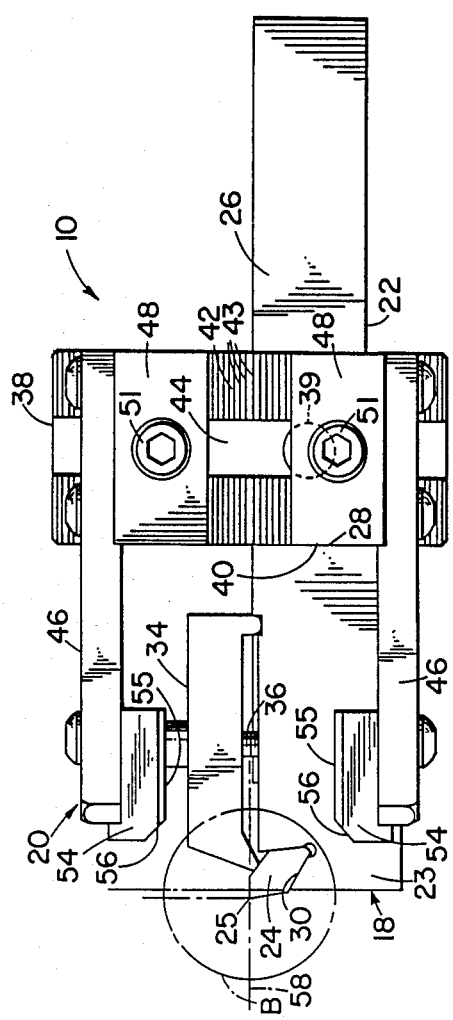
FIG. 2 is a somewhat enlarged fragmentary side elevational view of the combination tool shown in FIG. 1.
Figure 4:
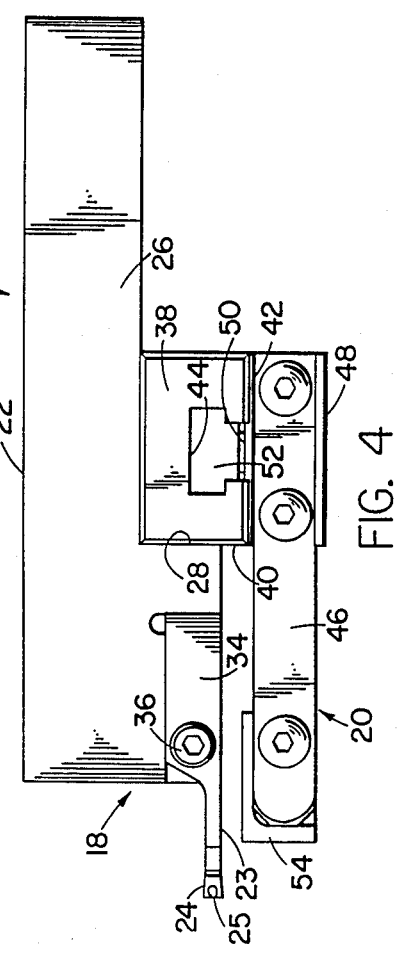
FIG. 4 is a top plan view of the combination tool shown in FIG. 2.

Considering now the illustrated combination tool 10 as oriented in the drawing and referring particularly to FIGS. 2–4, the tool 10 essentially comprises an elongated generally rectangular tool holder body 22 having an integral cutter insert supporting portion 23 of reduced width at its forward end for supporting a relatively narrow cutter insert 24 having a cutting edge 25 at its forward end. The tool holder body 22 also has an elongated rearwardly extending shank portion 26 for mounting to tool 10 at a work station of the turret 16. A vertically disposed and rearwardly facing abutment surface 28 is formed on the tool holder body 22 intermediate its ends and extends laterally outwardly from the shank to one side of the tool holder body 22. A generally V-shaped forwardly and upwardly open notch 30 is formed in the forward end of the cutter insert supporting portion 23 for receiving the diamond shaped carbide cutter insert 24. The insert 24 is releasably retained in the notch 30 by a clamping member 34 and an associated clamping screw 36 which extends through the clamping member and threadably engages the tool holder body 22, substantially as shown in FIGS. 2 and 4.

The bar puller has an elongated vertically extending jaw support member 38 of generally rectangular cross section. The jaw support member 38 is mounted in fixed position on the tool holder body 22 by at least one threaded fastener 39 (FIG. 2) which passes through an aperture in the support member and is threadably engaged in the body 22. A vertically disposed and forwardly facing bearing surface 40 on the support member 38 is disposed in generally face-to-face engagement with the abutment surface 28 and cooperates with the fastener 39 to retain the jaw support member and maintain it in fixed vertical position relative to the tool holder body 22. The jaw support member 38 further includes laterally outwardly facing jaw support surface 42 defined by a vertical series of uniformally spaced apart and longitudinally extending saw teeth 43,43. A tee-slot 44 extends vertically through the jaw support member 38 and opens laterally outwardly through the jaw support surface 42.

The bar puller further includes a pair of elongated resilient jaw supporting elements or spring fingers 46,46 mounted in cantilever position on the jaw support member 38 in vertically spaced relation to each other and extending in a forward direction generally parallel relation to the longitudinal axis of the tool holder body 22. Each jaw supporting element or jaw holder 46 is carried by a mounting pad 48 having a mounting surface defined by a plurality of saw teeth 50,50 of generally V-shaped cross section which complement associated saw teeth 43,43 on the jaw support member. Each mounting pad 48 is releasably secured to the jaw support member by an associated threaded fastener 51 which extends through the pad and engages an associated nut 52 received within and generally complementing an associated portion of the tee-slot 44.

A pair of opposing jaws 54,54 are mounted on the free ends of the jaw supporting elements 46,46 and retained by a pair of associated threaded fasteners. The jaws 54,54 have opposing gripping surfaces. Each bar gripping surface is defined by a plurality of saw teeth 55,55 which extend in the longitudinal direction and which have sharp edges for incising and gripping an associated bar such as the bar B. The jaws are laterally positioned relative to the cutter insert 24. Further, the jaws are positioned to opposite sides of a horizontal plane 58 passing through the cutting edge 25 and are spaced equal distances from the horizontal plane 58, as shown in FIGS. 2 and 3. Each jaw 54 has a chamfer or lead surface 56 at its forward end.

The bar puller of the present invention is adapted to pull bar stock automatically when mounted in the turret of a CNC lathe or the like. It is adjustable to accommodate bar stock in a wide range of sizes, as, for example, stock from ⅛ inch (0.3175 cm) diameter to 2¼ (5.715 cm) diameter.

The size of the bar to be machined is first determined. If the bar stock is ⅞ (2.2225 cm) diameter or greater, the jaw assemblies of the bar puller are positioned as shown in the drawing. However, if smaller bar stock is to be machined the position of the jaw assemblies must be reversed.

The jaws are set to accommodate small diameter stock by first loosening the fasteners 51,51 and then sliding the entire jaw assemblies out of the tee slot 44 and reversing the positions of the upper and lower jaw supporting elements 46,46 relative to the jaw support member 38. The jaws are then removed from the jaw supporting elements 46,46 and reassembled with the jaw supporting elements in reverse position so that the jaw gripping surfaces are disposed in opposing relation to each other. The opening between the jaw gripping surfaces is now set to ⅛ inch (0.3175 cm) less than the diameter of the bar to be machined.

The turret is moved along the X axis in the manual mode to bring the jaws into contact with the free end portion of the bar held by the chuck mechanism 14. The jaw puller is then moved an additional ⅛ inch (0.3175 cm) along the X axis and toward the bar to grip the bar. The jaws are now set for normal tension. Jaw tension may be increased by moving the jaws along the X axis an increased distance toward the bar. However, in the given example, the jaws should not be moved along the X axis more than ⅜ inch (0.9525 cm) from the point of contact with the bar and into gripping engagement with the bar.

In the programmed mode of operation the bar puller engages the bar during rapid traverse along the X axis while the spindle is stopped. The chuck then opens and the bar stock is pulled into machining position by movement of the turret along the Z axis. The chuck then closes and the bar puller is disengaged by reverse movement along the X axis.

I claim:

1. A combination tool for a lathe having a turret including a plurality of tool stations, said combination tool comprising a cut-off tool and a bar puller, said cut-off tool having a elongated longitudinally extending tool holder body including an elongated shank portion at its rear end for securing said combination tool at an associated tool station, and means for releasably retaining a cutter insert at the forward end of said tool holder body, the cutter insert having a cutting edge at its forward end, said bar puller having a pair of elongated resilient jaw holders having jaws at the forward ends thereof, means for mounting said jaw holders in cantilever position and vertically spaced apart relation to each other on said tool holder body to extend in a longitudinally forward direction and with said jaws in vertically opposing relation to each other at opposite sides of a horizontal plane passing through the cutting edge of a cutter insert retained at the forward end of said tool holder body, said jaws being laterally off-set relative to a cutter insert retained at the forward end of said tool holder body and spaced rearwardly of the forward end of the cutter insert.

2. The combination tool as set forth in claim 1 wherein said means for mounting said jaw holders comprises a jaw support member mounted in fixed position to said tool holder body and means for securing said jaw holders to said jaw support member for vertical adjustment relative to each other.

3. The combination tool as set forth in claim 2 wherein said means for securing said jaw holders is further characterized as means for securing said jaw holders to said jaw support member for reversible positioning relative to each other.

4. The combination tool as set forth in claim 3 wherein said jaws are releasably secured to said jaw holders for reversible positioning relative to said jaw holders.

5. The combination as et forth in claim 2 wherein said means for securing said jaw holders is further characterized as means for securing said jaw holders to said jaw support member for vertical incrimental adjustment relative to each other.

6. The combination tool as set forth in claim 1 wherein said jaws are spaced equal distances from said horizontal plane.

7. A combination tool for a lathe having a turret including a plurality of tool stations, said combination tool including a cut-off tool and a bar puller, said cut-off tool having an elongated tool holder body including a rearwardly extending shank for mounting said combination tool at an associated tool station and clamping means for releasably securing a cutter insert at the forward end of said tool holder body, the cutter insert having a cutting edge at its forward end, said bar puller being mounted on said tool holder body and having a pair of vertically spaced apart and forwardly extending resilient jaw supporting elements supported in cantilever position, said jaw supporting elements having a pair of opposing jaws at the forward ends thereof disposed at vertically opposite sides of a horizontal plane passing through the cutting edge of a cutter insert secured to said tool holder body by said clamping means and positioned rearwardly of and laterally offset from a cutter insert releasably secured to said tool holder body by said clamping means.

8. A combination tool as set forth in claim 7 wherein said jaws are vertically spaced equal distances from said horizontal plane.

9. A combination tool for a lathe having a rotary turret including a plurality of angularly spaced tool stations, said combination tool including a cut-off tool and a bar puller, said cut-off tool having an elongated tool holder body including an integral cutter insert supporting portion projecting forwardly at one side of said tool holder body and having a generally upwardly open notch for receiving and generally complementing an associated portion of a cutter insert received within said notch and having a cutting edge at its forward end, an integral rearwardly extending shank portion laterally offset relative to said cutter insert supporting portion and in the direction of the other side of said tool holder body, and a generally vertically disposed rearwardly facing abutment surface extending laterally outwardly from said shank portion to said one side, said cut-off tool having clamping means for releasably securing a cutter insert to said insert supporting portion and within said notch, said bar puller having a generally rectangular vertically disposed jaw support member mounted on said tool holder body adjacent said shank portion and having a forwardly facing bearing surface engaged with said abutment surface, said jaw support member having a vertically disposed tee-slot extending therethrough and a laterally outwardly facing mounting surface, a pair of mounting pads, a fastener securing each mounting pad to said jaw support member adjacent said mounting surface and including a bolt passing through said mounting pad and a nut received within said tee-slot and threadably engaged with said bolt, a pair of elongated resilient jaw supporting elements, each of said jaw supporting elements being fastened in forwardly extending cantilever position to an associated one of said mounting pads, a pair of opposing bar gripping jaws, each of said jaws being fastened to the forward end of an associated jaw supporting element, said jaws being disposed at vertically opposite sides of a horizontal plane passing through the cutting edge of a cutter insert secured to said insert supporting portion by said clamping means and laterally offset from and spaced rearwardly of the cutting edge of such cutter insert.

10. A combination tool as set forth in claim 9 wherein said jaws are vertically spaced equal distances from said horizontal plane.

* * * * *